H. B. CAMP.
Machine for Making Curved Eeathenware Pipes.

No. 161,202. Patented March 23, 1875.

Witnesses:
A. B. Curtiss
E. E. Rogers

Inventor:
Horace B. Camp
per Humphrey & Stuart, Attys.

THE GRAPHIC CO.PHOTO-LITH.39 & 41 PARK PLACE.N.Y.

UNITED STATES PATENT OFFICE.

HORACE B. CAMP, OF CUYAHOGA FALLS, OHIO.

IMPROVEMENT IN MACHINES FOR MAKING CURVED EARTHENWARE PIPES.

Specification forming part of Letters Patent No. 161,202, dated March 23, 1875; application filed March 24, 1874.

CASE A.

*To all whom it may concern:*

Be it known that I, HORACE B. CAMP, of Cuyahoga Falls, Summit county, Ohio, have invented an Improvement in the Manufacture of Curved Earthenware Pipes, of which the following is a specification:

My invention relates to the formation of curves, elbows, and traps in that class of sewer and water pipe made of clay or similar material by being pressed, while in a soft and plastic condition, through an annular orifice between an outside die and an inside core or mandrel, and subsequently burned and vitrified, but it may be applied to any pipe made in the same manner.

The object of my invention is to rapidly and easily form such curves, and so form them that they shall be of even thickness in every part. I accomplish this in the following manner, reference being had to the annexed drawing, wherein—

Figure 1:
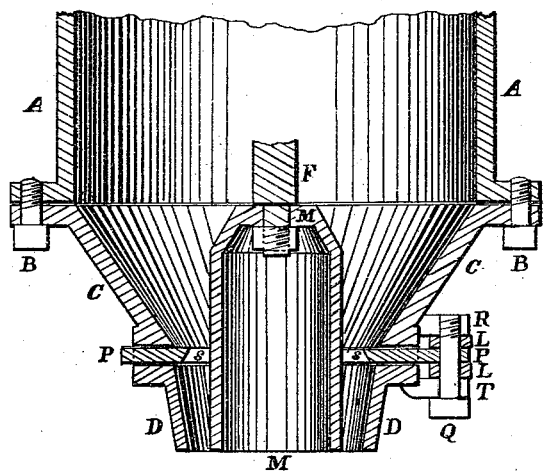

Figure 1 represents a central vertical section of a portion of an ordinary cylinder and attachments for making pipe, embodying my invention.

Figure 2:
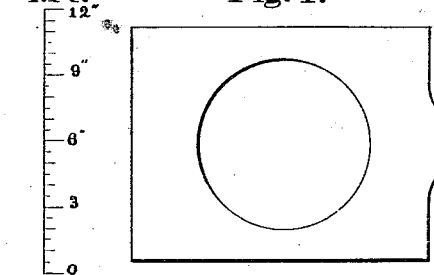
Figure 3:
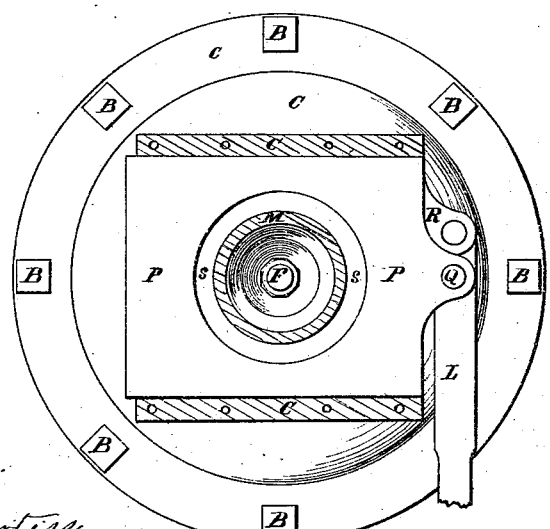

To the cylinder A, from which the clay is pressed to form the pipe, by a piston, (not shown,) is bolted a cylinder-head, C, made converging to facilitate the descent of the clay. To the head C is bolted the outside hollow die D, having an inside diameter at the bottom of the size of the desired pipe, and within which, supported centrally by means of the rod F, is the core or mandrel M, having an outside diameter of the size of the inside of the desired pipe. Between the die D and head C is a chamber or recess, in which is fitted a plate, P, Fig. 2, free to slide longitudinally in one direction at right angles to the main cylinder and core, and moved by means of a lever, L, which said lever is attached to the plate P by the bolt Q, and is hinged to the lugs R and T cast or attached to the head C and die D, respectively, as will appear from Fig. 3, which represents a transverse section of Fig. 1 at the bottom of the plate P, looking from below. Through the plate P is an orifice, of the shape, and approximately of the size, of the pipe to be made, within which the mandrel is suspended, and having the edges beveled from the upper surface outward. When the plate P remains so that the core M is exactly in the center of the orifice therein, the clay descends with the same rapidity on all sides of the core, and is discharged in a continuous straight pipe. By sliding the plate to one side, the space S between the edge of the orifice in the plate P and the mandrel is lessened on one side, and correspondingly increased on the other. The result of this is that the clay descends and escapes more rapidly on the opened side of the mandrel than on the side where the space S is contracted, and as it is discharged from the die D it curves toward the side on which the space is contracted. By sliding the plate to the other side, the pipe will curve in an opposite direction, and by a succession of movements of the plate, any desired form of curve or trap can be made. The relative positions of the die D and core M remain at all times unchanged, and as a result the pipe is of equal thickness on all sides.

I am aware that the principle of curving such pipes, by allowing the clay to discharge more freely on one side of an annular orifice than on the other, is not new, as I, as well as others, have for several years made single curves by rigidly setting either the core M or die D to one side of their common center, so as to be eccentric to the other, thereby making the annular orifice, when the pipe is discharged, larger on one side than on the other. Nor is the idea new of making parts of a pipe-machine movable at the will of the operator while the pipe is issuing, thereby enabling him to make reverse or other compound curves, as I am aware that several devices have been invented and patented for moving either the die D or mandrel M while the pipe was forming. But all these devices have reference to a change in the annular opening between the core M and die D at the point of discharge, and herein they differ radically from mine, in that the pipe is of uneven thickness on different sides.

What I claim as my invention, and desire to protect by Letters Patent, is—

The combination, in a machine for making pipe of plastic material, by pressing it through an annular orifice between an outside hollow die, and a core of a plate having an orifice of a shape conforming to the size of the pipe to be made, said plate having a beveled edge, and surrounding the mandrel, and interposed between the head of the receiver and the hollow die, substantially as described.

HORACE B. CAMP.

Witnesses:
   DAVID FOSDICK,
   I. L'HOMMEDIEU.